(12) United States Patent
Prenn et al.

(10) Patent No.: US 10,079,959 B2
(45) Date of Patent: Sep. 18, 2018

(54) CREATING IMAGE DATA FOR A TILE ON AN IMAGE

(71) Applicant: Hewlett-Packard Development Company, L.P., Houston, TX (US)

(72) Inventors: Mary T Prenn, Boise, ID (US); Bradley R Larson, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 32 days.

(21) Appl. No.: 15/308,094

(22) PCT Filed: Jul. 24, 2014

(86) PCT No.: PCT/US2014/047990
§ 371 (c)(1),
(2) Date: Oct. 31, 2016

(87) PCT Pub. No.: WO2016/014060
PCT Pub. Date: Jan. 28, 2016

(65) Prior Publication Data
US 2017/0054871 A1 Feb. 23, 2017

(51) Int. Cl.
*H04N 1/46* (2006.01)
*H04N 1/60* (2006.01)
(Continued)

(52) U.S. Cl.
CPC ......... *H04N 1/3873* (2013.01); *G06F 3/1211* (2013.01); *G06F 3/1247* (2013.01); *G06F 3/1285* (2013.01); *G06K 15/1851* (2013.01); *G06T 1/60* (2013.01); *H04N 1/00251* (2013.01); *H04N 1/2104* (2013.01); *H04N 1/41* (2013.01);
(Continued)

(58) Field of Classification Search
None
See application file for complete search history.

(56) References Cited

U.S. PATENT DOCUMENTS 6,038,339 A * 3/2000 Hubel .................. H04N 1/6086
358/516
6,471,332 B1 10/2002 Vilanova et al.
(Continued)

FOREIGN PATENT DOCUMENTS

CN 101517575 8/2009
CN 101930461 12/2010
(Continued)

OTHER PUBLICATIONS

International Searching Authority. International Search Report. Dated Mar. 15, 2015. Application No. PCT/US2014/047990. Filing date Jul. 24, 2014.
(Continued)

*Primary Examiner* — Madelein T Nguyen
(74) *Attorney, Agent, or Firm* — Trop Pruner & Hu PC (57) ABSTRACT

A data structure includes entries corresponding to a plurality of tiles that form part of an image, where a given entry of the entries includes color information for a given tile of the plurality of tiles. Image data in the given tile is created using the color information of the given entry, where creating the image data in the given tile using the color information of the given entry is performed without using input image data for the given tile.

12 Claims, 5 Drawing Sheets

(51) Int. Cl.

| | | |
|---|---|---|
| *H04N 1/387* | (2006.01) | |
| *G06F 3/12* | (2006.01) | |
| *G06T 1/60* | (2006.01) | |
| *G06K 15/02* | (2006.01) | |
| *H04N 1/00* | (2006.01) | |
| *H04N 1/21* | (2006.01) | |
| *H04N 1/41* | (2006.01) | |
| *H04N 1/64* | (2006.01) | |

(52) U.S. Cl.
CPC ........... *H04N 1/6008* (2013.01); *H04N 1/648* (2013.01); *G06K 2215/0094* (2013.01); *H04N 2201/0094* (2013.01)

(56) References Cited

U.S. PATENT DOCUMENTS

| | | | | |
|---|---|---|---|---|
| 6,714,196 B2* | 3/2004 | McCormack | ........... | G06T 11/40 345/419 |
| 6,829,063 B1* | 12/2004 | Allebach | ................ | H04N 1/52 358/3.13 |
| 6,912,664 B2* | 6/2005 | Ranganathan | ........ | G06F 1/3203 345/98 |
| 7,212,217 B1 | 5/2007 | Feather et al. | | |
| 7,813,588 B2* | 10/2010 | Bradburn | ............... | H04N 1/413 382/282 |
| 2001/0041014 A1* | 11/2001 | Kaneda | ................. | H04N 1/642 382/239 |
| 2003/0123093 A1 | 7/2003 | Hattori | | |
| 2005/0036701 A1 | 2/2005 | Miyazawa et al. | | |
| 2006/0170986 A1* | 8/2006 | Iriyama | ................ | H04N 1/4058 358/474 |
| 2007/0025627 A1 | 2/2007 | Hasegawa et al. | | |
| 2008/0144952 A1* | 6/2008 | Chen | ..................... | H04N 19/12 382/239 |
| 2011/0001994 A1 | 1/2011 | Matsuda | | |
| 2011/0157619 A1 | 6/2011 | Nelson et al. | | |
| 2011/0216969 A1 | 9/2011 | Chu et al. | | |
| 2013/0058571 A1 | 3/2013 | Jang et al. | | |
| 2013/0308875 A1 | 11/2013 | Jacobson et al. | | |
| 2014/0079297 A1* | 3/2014 | Tadayon | .................. | G06K 9/00 382/118 |
| 2014/0093186 A1 | 4/2014 | Sample et al. | | |
| 2014/0195921 A1* | 7/2014 | Grosz | ................... | G06F 3/1242 715/738 |
| 2014/0320928 A1* | 10/2014 | Kashti | ................. | H04N 1/4055 358/3.06 |
| 2016/0366036 A1* | 12/2016 | Gupta | ..................... | H04L 67/16 |
| 2017/0019487 A1* | 1/2017 | Maheshwari | ........... | H04L 67/16 |
| 2017/0054871 A1* | 2/2017 | Prenn | .................. | G06K 15/1851 |
| 2018/0024901 A1* | 1/2018 | Tankersley | ........ | G06F 17/30525 707/694 |

FOREIGN PATENT DOCUMENTS

| | | |
|---|---|---|
| CN | 102985906 | 3/2013 |
| EP | 0527097 | 2/1993 |

OTHER PUBLICATIONS

Paint Shop Pro User Guide, (Research Paper), Apr. 11, 2003, 446 Pages.

* cited by examiner

FILL COLOR STRUCTURE (702)

| | BYTE 0 | BYTE 1 | BYTE 2 | BYTE 3 |
|---|---|---|---|---|
| 3 – PLANE | C(R) | M(G) | Y(B) | NULL |
| 4 – PLANE | C | M | Y | K |
| MONOCHROME | NULL | NULL | NULL | K |

FIG. 7

CREATING IMAGE DATA FOR A TILE ON AN IMAGE

BACKGROUND

An image production device, such as a printer, computer, and so forth, can produce an image for output, such as printing, displaying, storing, communicating, and so forth. To produce an image for output, input image data can be retrieved. Processing can be applied to the input image data to create an image in a form that is appropriate for output.

BRIEF DESCRIPTION OF THE DRAWINGS

Some implementations are described with respect to the following figures.

DETAILED DESCRIPTION

An image production device can produce an image for output, such as printing, displaying, storing, communicating, and so forth. As examples, the image production device can be a printer, such as a multi-function printer or other type of printer. A multi-function printer (or more generally a "multi-function device") can include a scanner to scan an object, and a printing unit to print an output image based on a scanned version of the object.

In other examples, the image production device can be a computer, a handheld device, a storage device, or any other type of electronic device that is capable of producing an image for output. More generally, a "device" can refer to any arrangement that includes processing circuitry for performing specified tasks.

To produce an image for output, input image data can be received by the image production device. For example, the input image data can be generated by the image production device, such as by using an image capture device such as a camera or scanner of the image production device. The image capture device can be used to capture an image of an object. The object can be a document, a person, or any other type of object. In other examples, input image data can be received from a remote electronic device, such as over a network or by use of a removable storage media.

For improved efficiency when processing an image, input image data can be divided into multiple tiles (which can be non-overlapping), where each tile can have a specified size (e.g. a tile can be M pixels by N pixels, M>1, N>1). Each tile contains a corresponding portion of the input image data. The tiles can be stored in a memory of the image production device. In some cases, the input image data in the tiles can be compressed.

Subsequently, to produce an output image (an image for output such as printing, displaying, storing, communicating, etc.), the image production device can retrieve the input image data tiles, and can decompress each input image data tile to produce an output image. A benefit of dividing an image into tiles is that any manipulation or processing can be applied on a specific subset of the tiles, rather than on the entire image. As a result, for input image data stored in compressed form, just the subset of tiles have to be decompressed for manipulation or other processing, while the remainder of the tiles can remain in compressed form. Not having to decompress the entirety of the input image data for processing can reduce storage and processing resource demands.

Certain tiles of image data can correspond to relatively simple image elements, such as a border, a line, a bitmap font, a barcode, and so forth. Traditionally, even for a tile that corresponds to a simple image element, the respective portion of the input image data (which can be a high resolution input image data that includes a relatively large amount of content) is still employed to produce the tile. For example, the input image data portion is processed (e.g. compressed) and stored as a respective tile in compressed form—this consumes both processing and storage resources of the image production device.

In accordance with some implementations, to improve efficiency, at least some selected image tiles can be created without using a respective input image data portion. In this way, a relatively low resolution representation of each such selected image tile can be used, such that compressing of a high resolution image data portion can be avoided.

Figure 1:
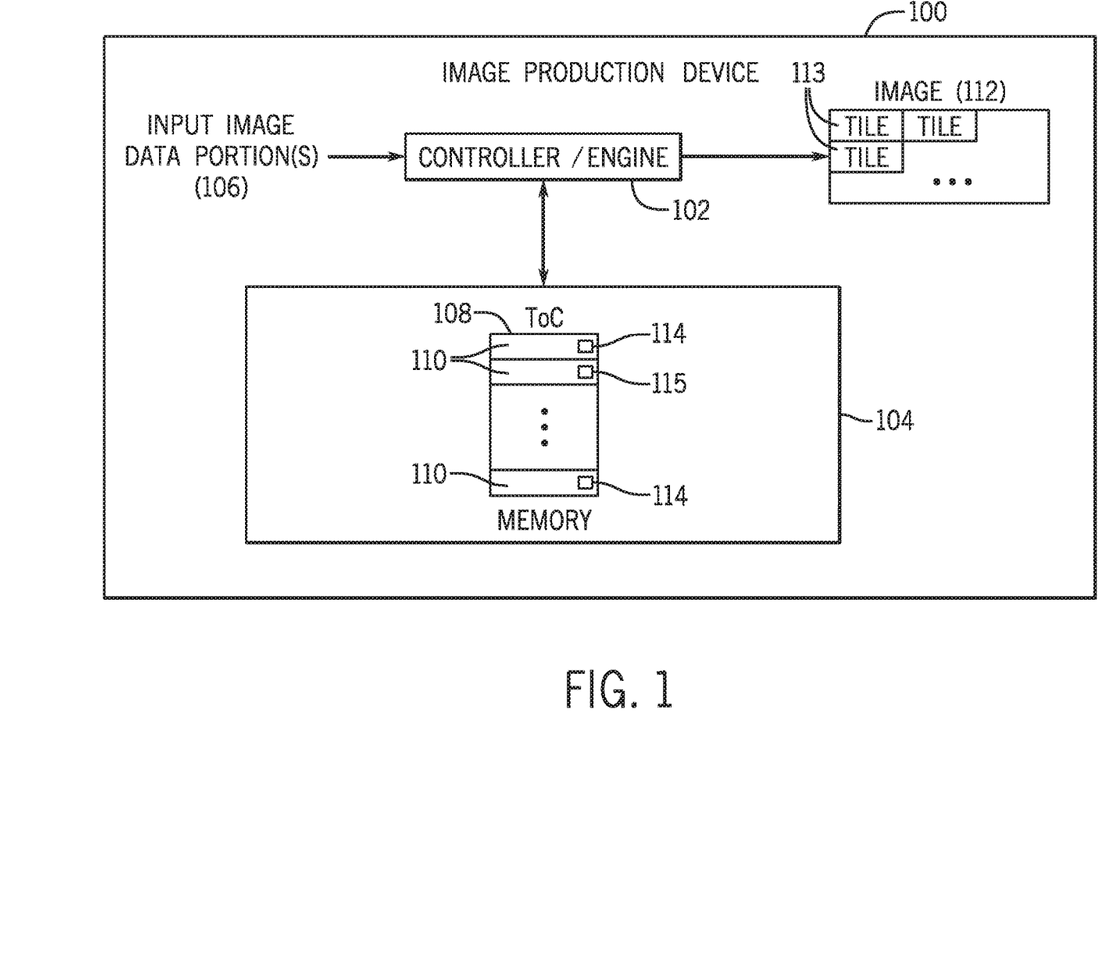
FIG. 1 is a block diagram of an example image production device, according to some implementations.

FIG. 1 is a block diagram of an example image production device 100, which includes a controller (also referred to as "engine") 102 and a memory 104. The controller (or engine) 102 can include processing circuitry, such as an application-specific integrated circuit (ASIC) device, a programmable gate array (PGA), a microprocessor, a microcontroller, a digital signal processor, and so forth. Although not shown in FIG. 1, machine-readable instructions (e.g. firmware and/or software) can be executable by the controller 102. In other examples, the controller 102 can perform various tasks without executing machine-readable instructions.

Although depicted as a single block in FIG. 1, note that the controller 102 can be implemented with multiple control devices (e.g. multiple ASIC devices, multiple PGAs, etc.) in some examples.

The memory 104 can store a table of contents (ToC) 108. The ToC 108 is an example of a data structure that links tiles of an image together, in a specified order. For example, the ToC 108 can link tiles 113 of an image 112 shown in FIG. 1. Entries 110 of the ToC contain metadata for the respective tiles 113. The metadata in each ToC entry 110 can include a pointer to the tile 113 in the memory 104, a position of each tile in an image, and other information. The ToC 108 can also be considered a linked list, which includes a list of entries that are linked together in a particular order, which corresponds to the order in which the tiles 113 are to be arranged in the image 112.

In some implementations, high resolution input image data portions do not have to be compressed and stored for certain selected tiles 113 of the image 112. The selected tiles 113 can correspond to relatively simple image elements, such as a border, a line, a bitmap font, a barcode. Instead, the controller 102 is able to use color information 114 that is included in a respective ToC entry 110 to generate image data for each such selected tile 113. As shown in FIG. 1, some of the ToC entries 110 can include color information 114, while other ToC entries 110 do not contain color information (these other ToC entries can include pointers 115 to an image data portion, as discussed further below).

The color information 114 in a ToC entry 110 can specify a color (or multiple colors) for a respective tile 113. Color information 114 in different ToC entries 110 can specify different colors or the same color.

The controller 102 can use the color information 114 of a respective ToC entry 110 to produce image data in a selected tile 113 of the image 112, without having to use any respective input image data portion. The generated tiles 113 can then be stored in the memory 104 for later retrieval for producing an output image for output, such as for printing, displaying, storing, communicating, and so forth.

Although reference is made to using the color information 114 of a respective ToC entry 110 to produce a tile that corresponds to a relatively simple image element, it is noted that techniques or mechanisms according to some implementations can be used to produce a tile that corresponds to a more complex image element.

Note also that while some selected tiles 113 of the image 112 are produced using the color information 114 of respective ToC entries 110 (without using the respective input image data portions), other tiles 113 of the image 112 can be produced using respective input image data portions 106. Such other tiles 113 containing the respective input image data portions 106 can be compressed and stored in the memory 104 in compressed form. However, note that compression does not have to be applied on selected tiles 113 produced from the respective color information 114 without using respective input image data portions.

Figure 2:
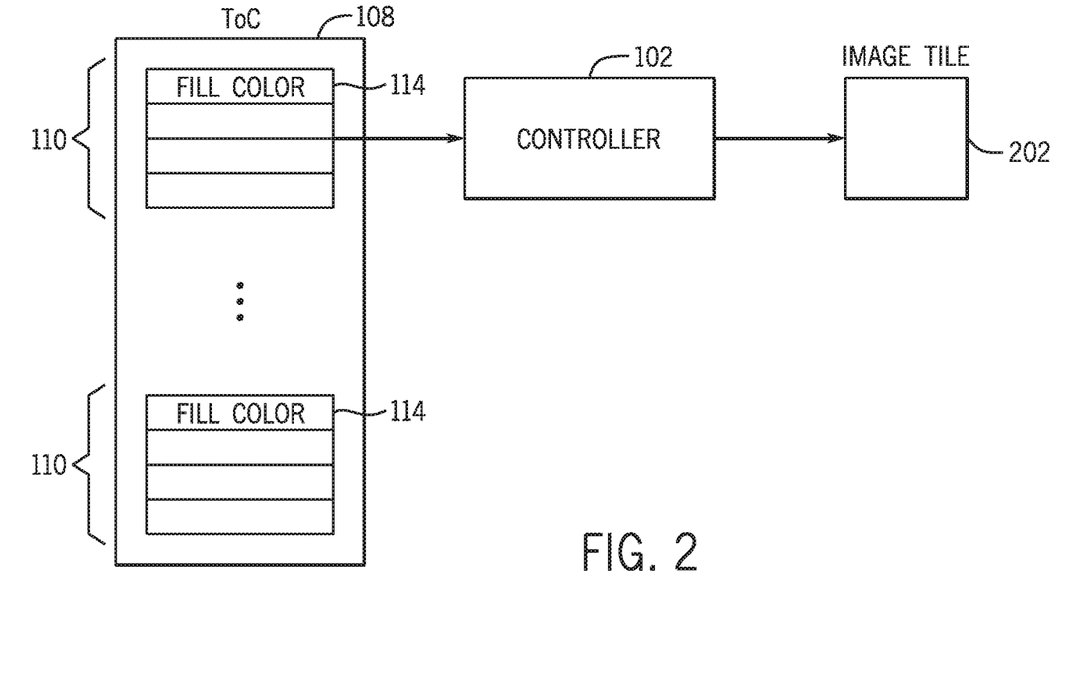
FIGS. 2-4 are schematic diagrams of various example processes of producing images for output, according to respective implementations.

FIG. 2 is a schematic diagram of an example process for producing an image tile 202 (which can be one of the tiles 113 of FIG. 1) by the controller 102, according to some examples. As shown in FIG. 2, the ToC 108 includes multiple entries 110, where each ToC entry 110 has multiple metadata. One of the metadata in each ToC entry 110 is the color information 114, which is referred to as a "fill color" in the example of FIG. 2. A "fill color" refers to a color that is used to fill a portion of an image.

The color information 114 can have a specific bit length, such as a long word (64 bits) or some other length. It is noted that the color information 114 is usually much shorter in bit length than a respective high resolution input image data portion that would traditionally be used to produce the image tile 202.

In an example according to FIG. 2, the controller 102 produces the image tile 202 that is filled with the color specified by the color information 114 of the respective ToC entry 110. A solid fill of the color specified by the respective color information 114 is thus provided in the image tile 202. The image tile 202 in FIG. 2 is an example of a tile containing a color fill or blank data, which is produced with just information of the respective ToC entry 110 alone (without a respective input image data portion).

Figure 3:
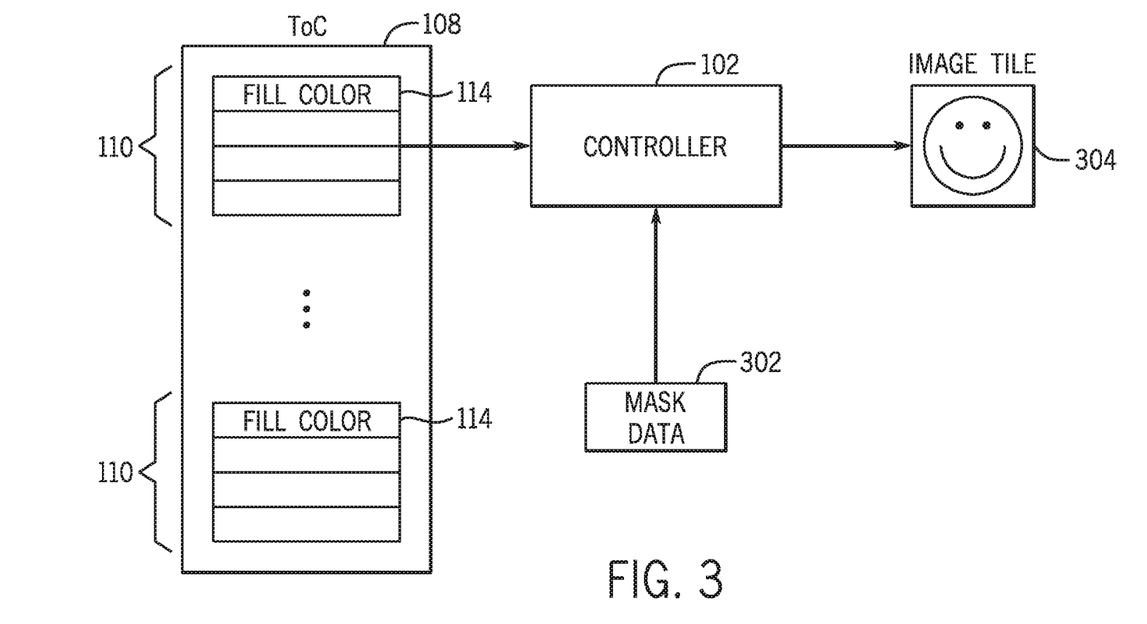

FIG. 3 is a schematic diagram of another example process for producing an image tile 304 (which can be one of the tiles 113 of FIG. 1) by the controller 102. In FIG. 3, the controller 102 uses mask data 302 in combination with the color information 114 of the respective ToC entry 110 to produce the image tile 304. The mask data 302 can include multiple indicators for respective portions of the image tile 304. As an example, each respective portion of the image tile 304 can be an individual pixel (or group of pixels) of the image tile 304. The indicators of the mask data 302 can include respective bits, where each bit corresponds to a respective individual pixel or group of pixels. If the bit is set to a first value, then the corresponding individual pixel (or group of pixels) in the image tile 304 is filled with the color of the color information 114 of the respective ToC entry 110.

However, if the bit is set to a second, different value, then the corresponding individual pixel (or group of pixels) of the image tile 304 is not filled with the color specified by the color information 114 of the respective ToC entry 110. In this manner, a more complex target image can be produced in the image tile 304, where certain portions of the image tile 304 are filled with the color specified by the respective color information 114, and the remaining portions of the image tile 304 are not filled with the color specified by the respective color information 114.

Figure 4:
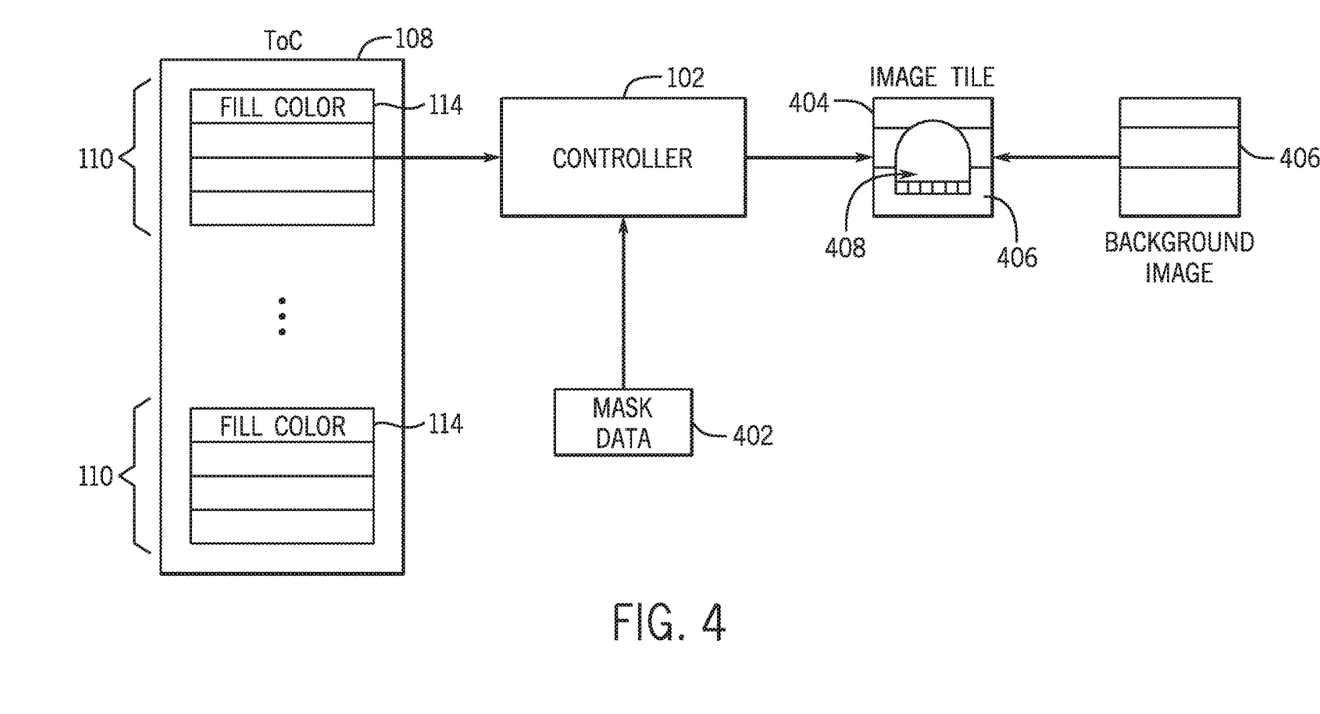

FIG. 4 is a schematic diagram of another example process for producing an image tile 404 (which can be one of the tiles 113 of FIG. 1) by the controller 102. In the FIG. 4 example, the color information 114 of a ToC entry 110 and mask data 402 are used by the controller 102 as part of an alpha blending process. An alpha blending process combines a translucent foreground color with a background color, to produce a new blended color. In FIG. 4, the controller 102 produces the image tile 404 that is based on alpha blending of a foreground image 408 and a background image 406. The foreground image 408 is produced based on the respective color information 114 and the mask data 402, while the background image 406 can be separately provided. Note that the background image 406 is received by the controller 102 for alpha blending with the foreground image 408. The foreground image 408 is overlaid over the background mage 406 in the alpha blending process.

In some implementations, an image tile (113, 202, 304, or 404) created from respective color information 114 and possibly mask data (302 or 402) can be a full resolution decompressed image portion. In some examples, a full resolution decompressed image portion can be represented by an P-bit per pixel per color representation, where P is a specified number (such as 8 or another number).

Figure 5:
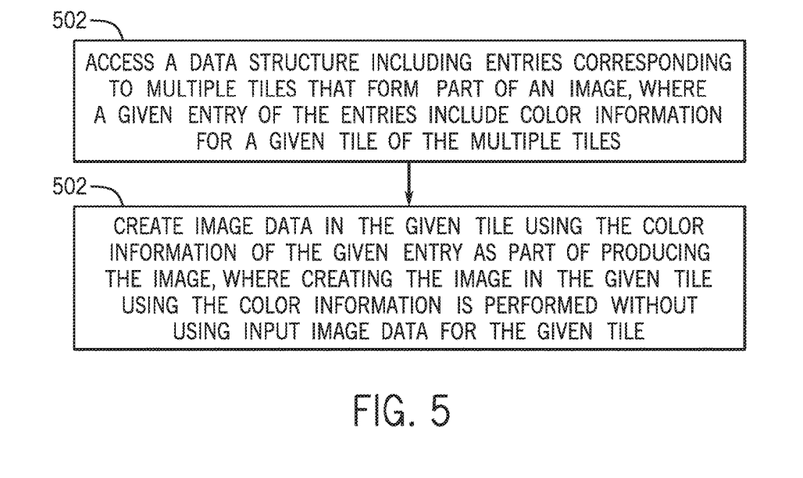
FIG. 5 is a flow diagram of an example process of producing an image for output, according to some implementations.

FIG. 5 is a flow diagram of a process according to some implementations. The process can be performed by the controller 102 depicted in any of the foregoing figures. The controller 102 accesses (at 502) a data structure including entries corresponding to multiple tiles that form part of an image, where a given entry of the entries includes color information for a given tile of the multiple tiles. In some examples, the data structure that is accessed can include the ToC 108 discussed above.

The controller 102 creates (at 504) image data in the given tile using the color information of the given entry of the data structure as part of producing the image. The creating of the image data in the given tile using the color information of the given entry is performed without using any input image data portion for the given tile.

Figure 6:
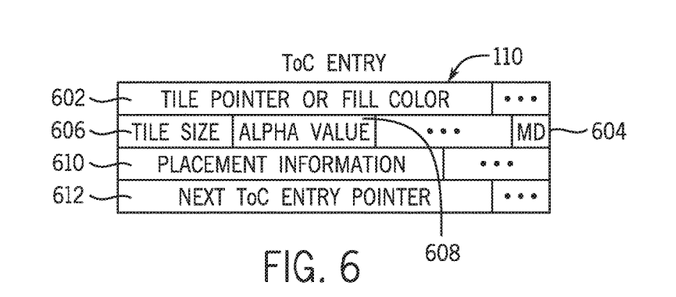
FIG. 6 is a schematic diagram of an entry of a table of contents, according to some implementations.

FIG. 6 is a schematic diagram of an example ToC entry 110 according to some examples. The ToC entry 110 corresponds to a respective tile of an image. The ToC entry 110 includes various elements, including a tile content element 602. The tile content element 602 can include a tile pointer (or a fill color (which is an example of the color information 114 discussed above). The tile pointer points to a compressed tile image data portion that is stored in memory.

An indicator (which in the example of FIG. 6 is referred to as an "MD flag" 604) specifies whether the tile content element 602 contains the tile pointer or the fill color. If the MD flag 604 is set to a first value, then the tile content element 602 contains the tile pointer, which indicates that the respective tile is to be produced based on the corresponding input image data portion identified by the tile pointer. On the other hand, if the MD flag 604 is set to a second, different value, then the tile content element 602 contains the fill color, which indicates that the respective tile is to be produced without using the corresponding input image data portion.

Another element of the ToC entry 10 is a tile size element 606, which specifies the size of the respective tile (which can be a compressed tile). An alpha value element 608 in the ToC entry 110 specifies whether or not alpha blending is to be applied. An example of alpha blending is depicted in FIG. 4 above.

A placement information element 610 in the ToC entry 110 specifies a placement of the respective tile in an image. For example, the placement information 610 can be expressed in the form of an offset from a base address for the image or a portion of the image.

The ToC entry 110 also includes a next ToC entry pointer element 612 that stores a pointer to the next ToC entry. The next ToC entry pointer element 612 identifies the ToC entry for the next tile. The next ToC entry pointers in respective ToC entries 110 allow linking of tiles of an image.

Figure 7:
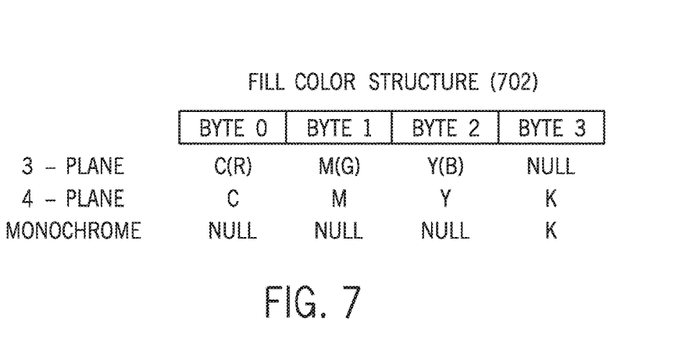
FIG. 7 is a schematic diagram of a fill color structure for producing different colors, according to some implementations.

FIG. 7 is a schematic diagram of a data structure 702 for the color information 114 (e.g. the fill color). In the example of FIG. 7, it is assumed that the color information 114 is represented with a 4-byte data structure 702. To describe a 3-plane fill color, such as CMY (cyan, magenta, yellow) or RGB (red, green, black), three of the bytes of the data structure 702 are used, while the remaining byte is not used (indicated as "null" in FIG. 7). To describe a 4-plane fill color, such as CMYK (cyan, magenta, yellow, and key), all four bytes of the data structure 702 are used. To describe a monochrome fill, just one of the bytes of the data structure 702 is used, while the remaining bytes are not used (indicated by "null").

As noted above, in some implementations, machine-readable instructions can be executable on the controller 102 to perform the foregoing tasks. Such machine-readable instructions are loaded for execution on a processing circuit, in the form of the controller 102.

The machine-readable instructions can be stored in one or multiple non-transitory computer-readable or machine-readable storage media. The storage media can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising;
   accessing, by a device including a processor, a data structure including entries corresponding to a plurality of tiles that form part of an image, wherein a given entry of the entries includes color information for a given tile of the plurality of tiles;
   creating, by the device, image data in the given tile using the color information of the given entry as part of producing the image, wherein creating the image data in the given tile using the color information of the given entry is performed without using input image data for the given tile;
   accessing color specified by the color information of the given, entry, and which second portions of the given tile are not to be filled with the color specified by the color information of the given entry, wherein creating the image data in the given tile uses the mask data.

2. The method of claim 1, wherein the mask data includes a plurality of indicators for respective portions of the given die, each of the plurality indicators settable to a first value to specify that a corresponding portion of the given tile is to be filled with the color specified by the color information of the given entry, and a second value to specify that a corresponding portion of the given tile is not to be filled with the color specified by the color information of the given entry.

3. The method of claim 2, wherein the plurality of indicators include a plurality of bits for respective pixels or groups of pixels of the given tile.

4. The method of claim 1, wherein a second entry of the entries of the data structure includes second color information for a second tile of the plurality of tiles, the method further comprising:
   creating, by the device, image data in the second tile using the second color information of the second entry as part of producing the image, wherein creating the image data in the second tile using the second color information of the second entry is performed without using input image data for the second tile.

5. The method of claim 1, further comprising blending the created image data for the given tile with a background image to overlay the created image data over the background image.

6. The method of claim 1, further comprising:
   receiving an input image data portion for a further tile of the plurality of tiles;
   creating image data for the further tile using the received image data portion; and
   compressing the further tile and storing the compressed further tile in a memory.

7. The method of claim 6, further comprising storing the given tile in the memory without compressing the given tile.

8. The method of claim 1, wherein the given entry of the data structure includes an indicator settable to a first value to specify that an element of the data structure contains the color information, and settable to a second, different value to specify that the element of the data structure contains a pointer to an input image data portion,
   wherein creating the image in the given tile using the color information is in response to determining that the indicator is set to the first value.

9. A device comprising:
a memory to store image data for a first tile of a plurality of tiles for an image, and to store a data structure that links the plurality of tiles to form the image, the data structure including a first entry for the first tile, and a second entry for a second tile of the plurality of tiles; and
a controller to:
as part of producing the image,
create the image data for the first tile using an input image data portion; and
create image data for the second tile using color information in the second entry, wherein creating the image data in the second tile using the color information in the second entry is performed without using any input image data for the second tile, and wherein creating the image data in the second tile comprises accessing mask data indicting which portions of the second tile are to be filled with a color specified by the color information, and which other portions of the second tile are not to be filled with the color specified by the color information.

10. The device of claim 9, wherein the first entry of the data structure includes a pointer to the image data stored in the memory, and the second entry of the data structure includes the color information.

11. The device of claim 10, wherein the first entry includes an indicator set to a first value to specify that the first entry contains the pointer, and the second entry includes an indicator set to a second, different value to specify that the second entry contains the color information.

12. An article comprising; at least one non-transitory machine-readable storage medium storing instructions that upon execution cause a device to:
access a data structure including entries containing respective location information specifying positions of titles within an image, wherein a given entry of the entries includes color information for a given tile of the plurality of tiles;
access mask data specifying which first portions of the given tile are to be filled with a color specified by the color information of the given entry, and which second portions of the given tile are not to be filled with, the color specified by the color information of the given entry, wherein creating the image data in the given tile uses the mask data; and
create image data in the given tile using the color information of the given entry as part of producing the image, wherein creating the image data in the given tile using the color information of the given entry" is performed without using input image data for the given tile.

* * * * *

UNITED STATES PATENT AND TRADEMARK OFFICE
CERTIFICATE OF CORRECTION

PATENT NO. : 10,079,959 B2
APPLICATION NO. : 15/308094
DATED : September 18, 2018
INVENTOR(S) : Mary T Prenn et al.

Page 1 of 1

It is certified that error appears in the above-identified patent and that said Letters Patent is hereby corrected as shown below:

In the Claims

In Column 8, Line 11 (approx.), in Claim 12, delete "titles" and insert -- tiles --, therefor.
In Column 8, Line 24 (approx.), in Claim 12, delete "entry"" and insert -- entry --, therefor.

Signed and Sealed this
Nineteenth Day of November, 2019

Andrei Iancu
*Director of the United States Patent and Trademark Office*